June 13, 1950  J. D. WOODWARD  2,511,030
OMNIDIRECTIONAL BEACON

Filed Feb. 27, 1945  4 Sheets-Sheet 1

INVENTOR.
JOHN D. WOODWARD
BY
William D. Hall.
ATTORNEY

June 13, 1950     J. D. WOODWARD     2,511,030
OMNIDIRECTIONAL BEACON

Filed Feb. 27, 1945     4 Sheets-Sheet 2

INVENTOR.
JOHN D. WOODWARD
BY
*William D. Hall.*
ATTORNEY

June 13, 1950

J. D. WOODWARD 2,511,030

OMNIDIRECTIONAL BEACON

Filed Feb. 27, 1945

INVENTOR.
JOHN D. WOODWARD

BY
William D. Hall.

ATTORNEY

Patented June 13, 1950

2,511,030

UNITED STATES PATENT OFFICE 2,511,030

OMNIDIRECTIONAL BEACON

John D. Woodward, Dayton, Ohio

Application February 27, 1945, Serial No. 580,063

10 Claims. (Cl. 343—106)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates to radio airway beacons.

An object of the invention is to transmit omnidirectional beacon signals for guidance of aircraft.

A further object is to transmit such signals with maximum stability.

A further object is to provide automatic monitoring of the transmitted signals to stabilize the courses.

A further object is to provide a means for orienting the courses in azimuth without physically moving the antenna system or sacrificing accuracy.

A further object is to provide a means for establishing a particular course of an omnidirectional beacon with maximum stability and accuracy.

A further object is to provide an omnidirectional beacon system which will provide a direct and continuous indication of the position of an aircraft with respect to azimuth around the beacon transmitting site.

A further object is to provide a stable omnidirectional beacon system which is usable on ultra high frequencies for short range navigation as well as on the lowest radio frequencies for long range navigation.

A further object is to provide a system that is free from errors due to radio frequency phase shift in the transmitting equipment.

A further object is to provide an omnidirectional beacon system that provides azimuth indication in a moving aircraft by means of an audio frequency phasemeter.

A further object is to provide a system that will operate with maximum accuracy when using any desired predetermined audio frequency for the phasemeter in the aircraft.

Many types of omnidirectional radio beacons have been proposed or used such as those employing physically rotating antenna systems, those employing rotating capacity or goniometer type modulation of the antenna system, or those having suppressed carrier and phased sideband transmission systems.

In such systems the accuracy and course stability are limited by the mechanically rotating components and by the phasing of the resonant circuits in the radio transmitters.

Systems requiring mechanical modulation of the antennae are limited by the maximum possible speed of rotation of the mechanical modulator.

Systems having suppressed carrier type of modulation require precise maintenance of the radio frequency phase in the transmitting equipment.

As will be hereinafter described this novel system is free from errors due to radio frequency phase shifts in the radio transmitters, has no delicately balanced mechanical moving parts associated with the modulation or antenna array, provides automatic stabilization of the courses, includes a simple means for orienting the courses, and permits the use of audio frequencies most suitable for operation of the phasemeter in the aircraft.

The system described herein may be used at any desired radio frequency and the audio frequencies involved may be chosen over a wide range of values. For simplicity in describing the system specific values of both audio and radio frequencies have been chosen. To illustrate generally the principles involved, reference is made to the drawings wherein like reference numerals refer to like parts throughout the various views.

In the drawings, Fig. 1 is a block diagram illustrating in simplified form the interconnections of the various components of the beacon system.

Figure 1:
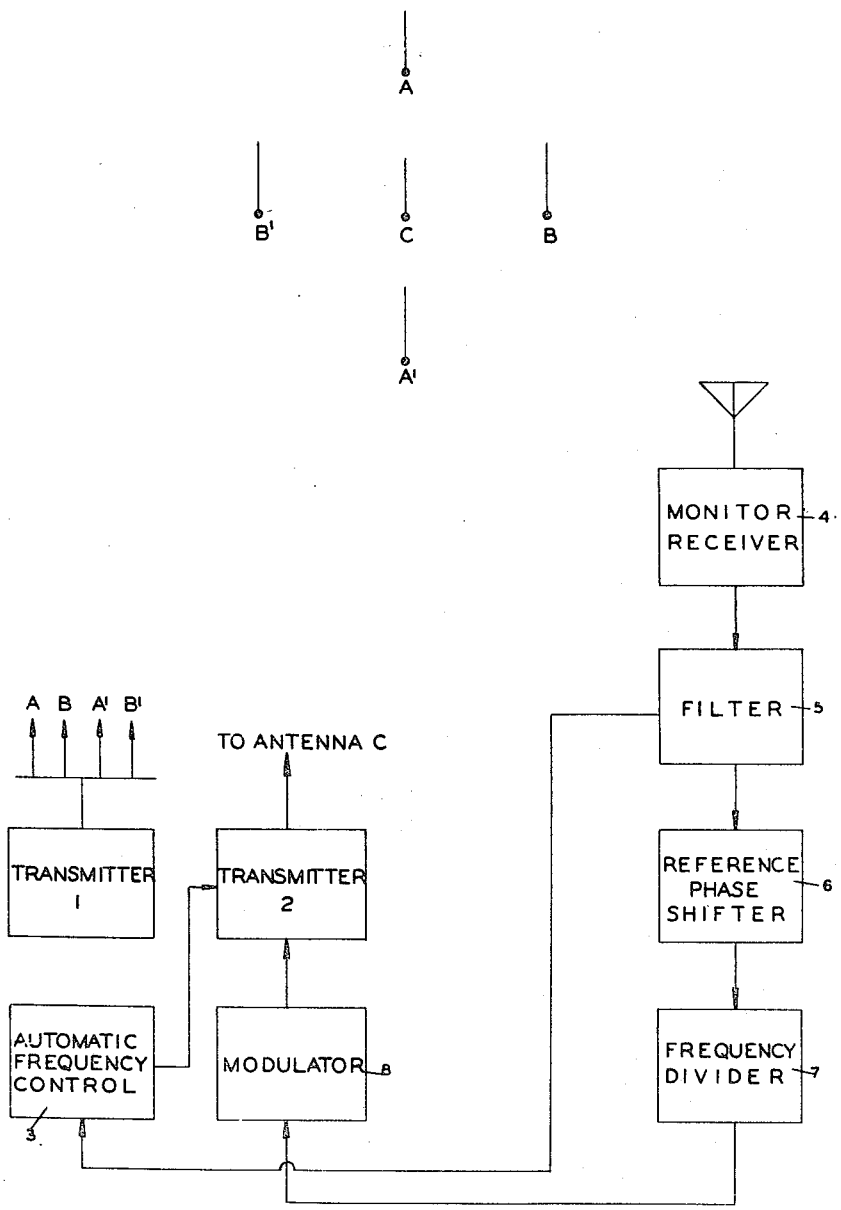

Referring to Fig. 1, four antennas are equally spaced around the circumference of a circle whose center is at C, at which point a fifth antenna is located. Outer antennas A, B, A', and B' are excited from radio transmitter 1 whose output is at a frequency of 100,000,600 cycles per second (referred to hereinafter as $f_1$). The lengths of the transmission lines to the four antennas are adjusted so that the values of the radio frequency phase of the currents in antennas A, B, A' and B' are 0, 90, 180, 270 degrees respectively. The radius of the circle locating the four outer antennas is 60 electrical degrees (measured at frequency $f_1$). This radius is not critical and could be chosen at some other value.

With this method of phasing, the phase of the radiated field at frequency $f_1$ will vary in space with azimuth. When the instantaneous value of the radiation along a projection of the line from C through A is at a maximum positive polarity, the instantaneous value of the radiated field along the projection of the line from C through B' will be zero. Likewise the instantaneous value of the radiated field along the projection of the line from C through A' will be at a maximum negative value. Thus the relative phase of the radiated field at frequency $f_1$ from antennas A, B, A', and B' will vary directly with azimuth.

Again referring to Fig. 1, transmitter 2 supplies energy to center antenna C at a frequency of 100,000,000 cycles per second, (hereinafter referred to as $f_2$). As frequency $f_2$ is radiated from a single antenna the phase of the radiated field will not vary with azimuth. That is, its phase measurement will be equal from all directions.

As frequencies $f_1$ and $f_2$ differ by only 600 cycles per second a conventional aircraft receiver will be equally sensitive to both $f_1$ and $f_2$. The output of such a receiver located in an aircraft will, when receiving $f_1$ and $f_2$, include an audio voltage at a frequency of 600 cycles per second which is the beat frequency between $f_1$ and $f_2$. As the relative phase of frequency $f_1$ varies directly with azimuth and the relative phase of $f_2$ is independent of azimuth, the relative phase of the 600 cycle beat between $f_1$ and $f_2$ will vary directly with azimuth.

Referring to Fig. 1, automatic frequency control 3 maintains the frequency difference between $f_1$ and $f_2$ at the specified value of 600 cycles. As hereinafter described the automatic frequency control will maintain the 600 cycle difference between $f_1$ and $f_2$ within close limits. The absolute value of $f_1$ may vary within the normal limits of conventional crystal control stability and the automatic frequency control will maintain the 600 cycle frequency difference within the required limits.

In order to determine azimuth by measurement of the relative phase of the 600 cycle beat note a reference must be established. As described hereinafter this novel system provides a method of furnishing a reference signal with maximum accuracy and stability.

Referring to Fig. 1, monitor receiver 4 is located in the vicinity of the transmitting antennae. The distance from the antennae is not critical. The audio output of monitor receiver 4 will include the 600 cycle beat note between frequencies $f_1$ and $f_2$. Filter 5 is designed to attenuate all signals except the 600 cycle beat note. Reference phase shifter 6 provides a means of shifting the phase of the 600 cycle beat note as described hereinafter. Frequency divider 7 divides the 600 cycle beat note by a factor of 3 resulting in an output at a frequency of 200 cycles per second. By means of a conventional modulator 8 the 200 cycle voltage from frequency divider 7 is applied as amplitude modulation to radio transmitter 2, transmitting through antenna C. Thus the output of a distant, mobile receiver located in an aircraft will contain, in addition to the 600 cycle beat between $f_1$ and $f_2$, a 200 cycle voltage derived from the amplitude modulation of $f_2$. As $f_2$ is radiated from a single antenna C the phase of the 200 cycle voltage will not vary with azimuth.

Figure 2:
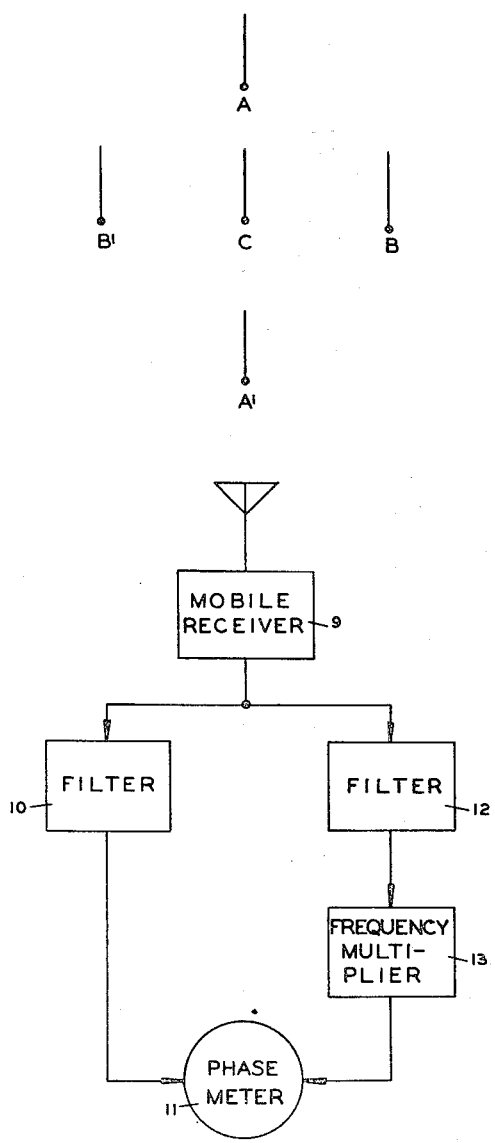
Fig. 2 is a block diagram illustrating in simplified form the interconnections of the various components employed in a moving aircraft to receive and evaluate the azimuth information transmitted by the beacon system of Fig. 1, the antennae stubs marked A, A', B, B', C designating the antennae system of Fig. 1.

Referring to Fig. 2, mobile aircraft receiver 9 receives the radiation from antenna system A, B, A', B', C. The output of receiver 9 includes a 600 cycle voltage, derived from the beat between $f_1$ and $f_2$, which varies in phase directly with azimuth; and a 200 cycle voltage, derived from the amplitude modulation of $f_2$, which does not vary in phase with azimuth. The 600 cycle voltage is passed through filter 10 in the aircraft which attenuates all other voltages. From the filter 10 the 600 cycle voltage is applied to a phasemeter 11. The 200 cycle output from receiver 9 is likewise passed through a filter 12 which attenuates all other voltages. The 200 cycle voltage is then applied to frequency multiplier 13. The output of frequency multiplier 13 is now at a frequency of 600 cycles and is hereinafter referred to as the reference 600 cycle voltage. Phasemeter 11 indicates the phase difference between the azimuth-phase variable 600 cycle voltage, derived from the beat between $f_1$ and $f_2$ and the constant-phase reference 600 cycle voltage. As the phase of the variable 600 cycle signal varies directly with azimuth and the phase of the reference 600 cycle voltage is independent of azimuth, the phasemeter reading will be a direct measure of azimuth. It will be noted that the function of the frequency multiplier is to equalize the frequencies of the 200 cycle and 600 cycle voltages so that the phasemeter measures only phase difference. In multiplying the 200 cycles to 600 cycles, no change was made in the phase of the signal, just as no change in phase was introduced at the transmitter when the divider made a 200 cycle signal out of 600 cycles.

Analysis of this novel method of deriving the 600 cycle reference voltage shows that it provides a stabilizing feature that is not included in systems deriving the reference voltage from motor generator sets or from mechanical modulators. For example, in this system an unavoidable radio frequency phase shift in either transmitter 1 or 2 of Fig. 1 will result in equal phase shifts in both of the 600 cycle voltages applied to the phasemeter 11 of Fig. 2. As both voltages are shifted equally in phase, should a shift occur, a radio frequency phase shift in the radio transmitters will not result in an error of phase indication in the aircraft, because there can be no relative phase shift of the two voltages which is not compensated for automatically. In this respect the system possesses an inherent locked-phase characteristic between the two frequencies.

Referring to Fig. 1, the reference phase shifter 6 may be used to deliberately shift the phase of the reference 600 cycle voltage any desired amount. Thus the orientation of the courses with respect to azimuth may be conveniently set to any desired value without disturbing the antennas.

The location of the monitor receiver 4 with respect to the transmitting antennas A, B, A', B', C is not critical. If the course in a particular direction is required to have a maximum stability the monitor receiver can be located in this direction relative to the transmitting antennas.

In omnidirectional beacon systems employing suppressed carrier transmission three separate transmitters are required and the radio frequency phase of each of these transmitters must be maintained with a high degree of precision. In this novel system only two radio transmitters are required and the accuracy is independent of the phase of the radio frequency outputs from these two transmitters, since any shift which may occur is self-compensatory.

Figure 3:
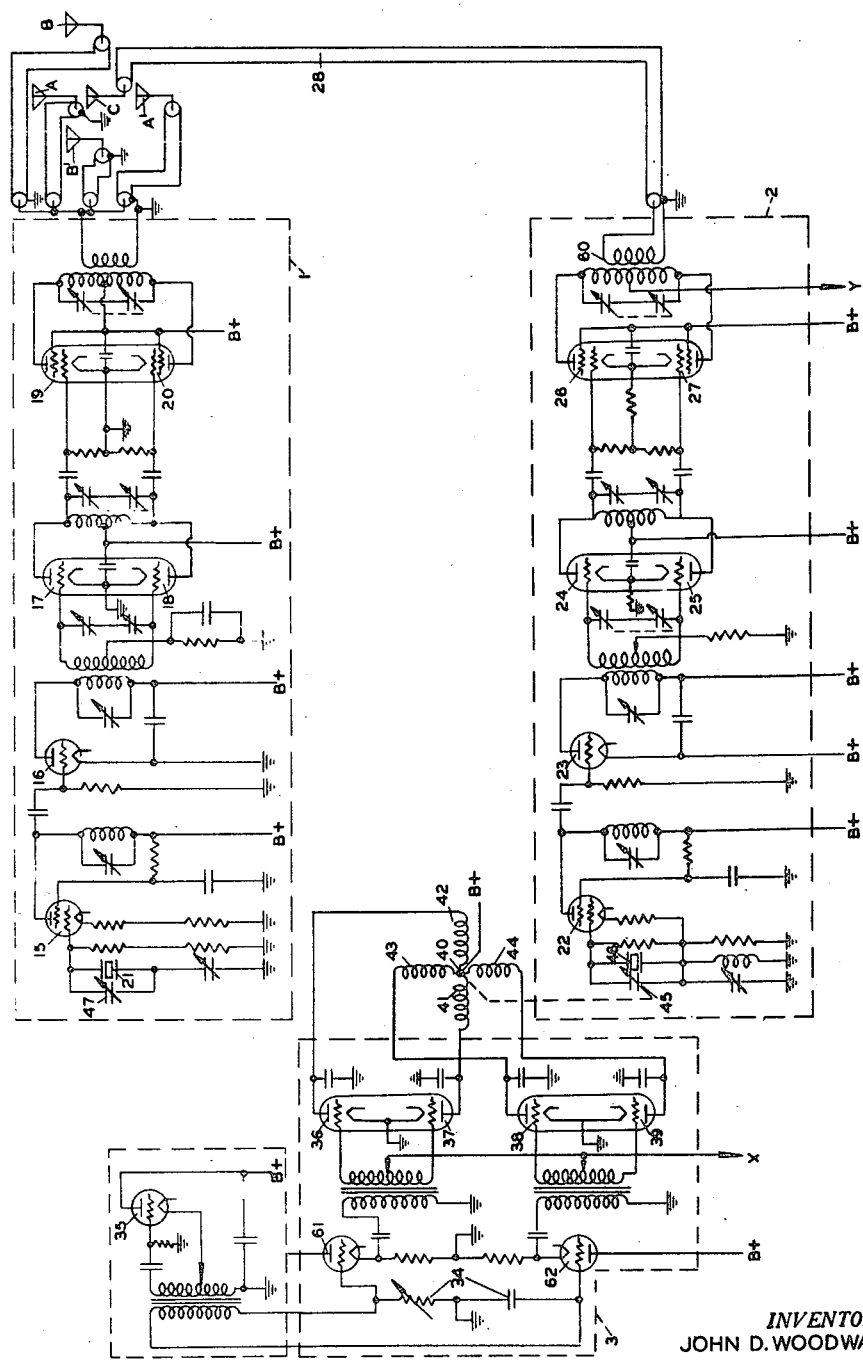
Fig. 3 is a schematic diagram illustrating a portion of the circuits and components which may be employed to practice the invention, the main units shown here being the two transmitters, automatic frequency control, standard oscillator, and the antennae.

To further illustrate this novel system a simplified schematic diagram of a practical application is shown in Fig. 3. Specific operating frequencies have been chosen to simplify the explanation, however, the system can be operated at any radio frequency and the audio frequencies may be chosen over a wide range.

Referring to Figure 3, tubes 15 to 20 inclusive, together with their associated circuit elements, comprise a conventional crystal-controlled radio transmitter 1. The output frequency of this transmitter is 100,000,600 cycles per second. The frequency-controlling crystal 21 operates at 1/18 of the output frequency. The frequency is doubled in the plate circuit of the oscillator tube 15, tripled by tube 16, and tripled again by tubes 17 and 18. Tubes 19 and 20 are operated as conventional class C amplifiers. The radio frequency output from 19 and 20 is coupled to antennas A, B, A', B', by transmission lines. The antennas are matched to the lines and all radiate equal power. The lengths of the respective lines are adjusted so that the relative phases of the currents in these four antennas are 0, 90, 180, and 270 degrees respectively.

Tubes 22 to 27 inclusive together with their associated circuits comprise a second conventional crystal controlled radio transmitter 2 quite similar to the first transmitter. The output frequency of this second transmitter is 100,000,000 cycles per second. The output of tubes 26 and 27 is coupled to antenna C through a transmission line 28.

Although, for purposes of illustration, the frequency of transmitter 1 was specified as 100,000,600 cycles per second, and that of transmitter 2 as 100,000,000 cycles per second, the absolute value of these two frequencies is not critical so long as the 600 cycle difference between them is maintained closely. Thus the crystals can be of conventional types and the 600 cycle difference will be maintained as described hereinafter.

Figure 4:
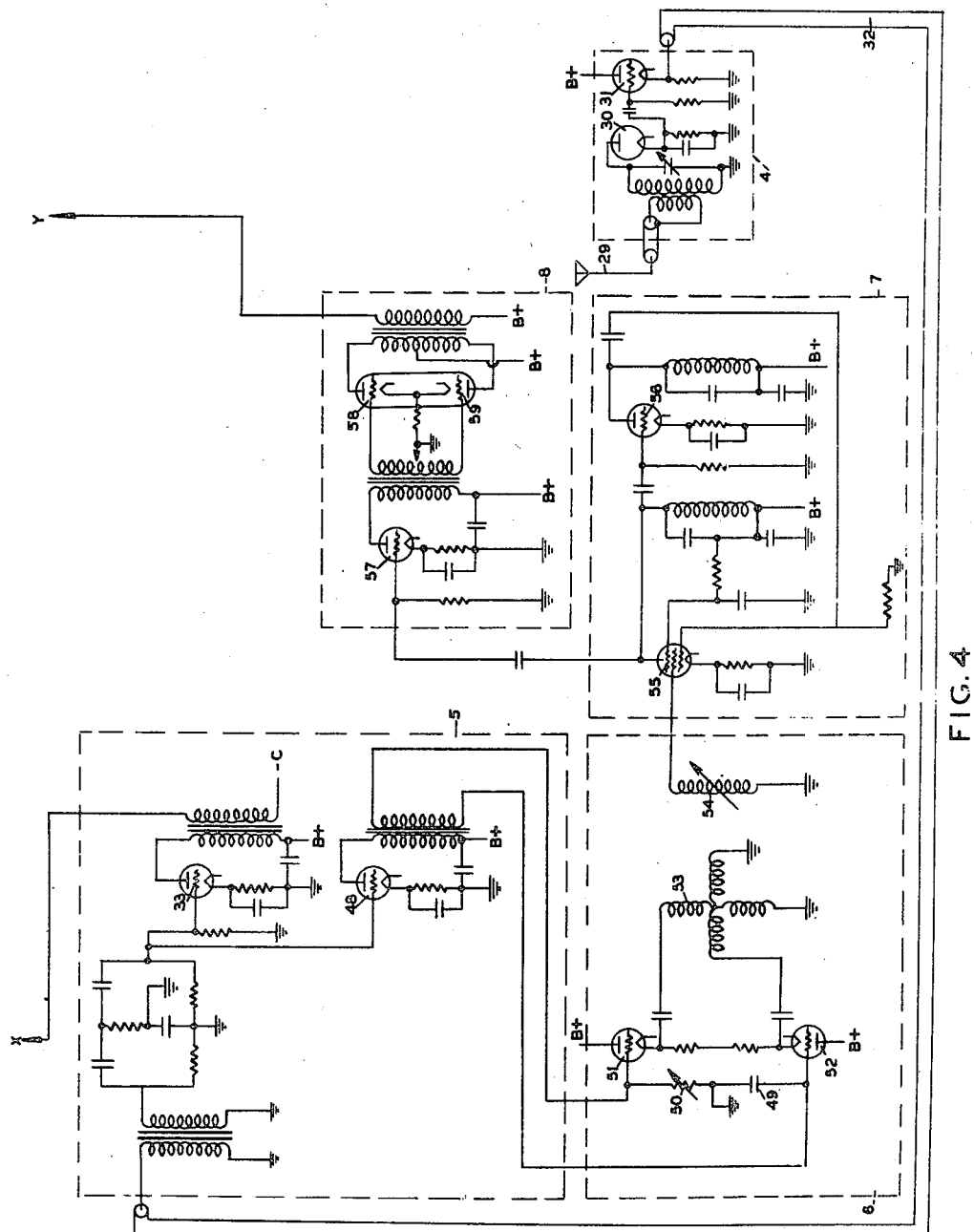
Fig. 4 is a schematic diagram illustrating the remainder of the components and circuits used in conjunction with those of Fig. 3; the main units shown here being the phase shifter, frequency divider, filter, modulator and monitor receiver, the open arrows marked "X" and "Y" indicating connection is to be made with arrows correspondingly marked in Fig. 3.

The radiation from antennas A, B, A', B', C is received on the monitor receiver antenna 29 in Fig. 4. In the monitor receiver 4 the signals are detected by tube 30 and coupled to an audio frequency transmission line 32 by cathode follower 31. From this transmission line the detected audio voltages go to the monitor filter system 5. The voltages from the monitor receiver will consist of the 600 cycle beat between the two transmitted radio frequencies and a 200 cycle voltage derived from the modulation on transmitter 2. The filter system eliminates the 200 cycle voltage so that the output of amplifier tube 33 consists of the 600 cycle beat note only. The 600 cycle beat note is compared with a standard 600 cycle voltage in the balanced modulator of automatic frequency control 3 of Fig. 3. The standard 600 cycle voltage is obtained from a stable oscillator comprised of tube 35 and its associated circuits. The 600 cycle beat note is applied in like phase to all four grids of the modulator tubes 36, 37, 38, and 39. The standard 600 cycle voltage is applied by superposition to the grids of the modulator tubes 36, 37, 38, 39 through resistance-capacitance network 34 and cathode follower tubes 60 and 62 with the respective phase relationships of 0, 90, 180, and 270. Thus motor 40, which is connected in the plate circuit of the modulator tubes, will be supplied with energy at a frequency which is the difference between the standard 600 cycle voltage and the beat note from the two transmitters. Motor 40 is so designed that it will run synchronously at any frequency from 0 up to approximately 100 cycles per second. Due to the phasing of the standard 600 cycle voltage on the grids of the balanced modulator tubes the energy in the four motor fields will have the phase relationships of 0, 90, 180 and 270 degrees, respectively. The phasing of the currents in the motor fields 41, 42, 43, 44, results in a rotating magnetic field in the motor. The rotor of the motor 40 is made of magnetic material and is so designed that it aligns itself with the magnetic field. As the field rotates the rotor follows it. Thus the output shaft of the motor rotates synchronously at a speed that is proportional to the departure of the transmitter beat note frequency from the standard 600 cycle oscillator frequency. The direction of rotation depends on whether the transmitter beat note is higher or lower than the 600 cycle standard.

The motor 40 drives a variable condenser 45 which is connected in parallel with crystal 46. Condenser 45 will vary the frequency of its associated crystal oscillator 22. Thus if the beat note between the two radio transmitters departs from the desired value of 600 cycles, motor 40 will rotate condenser 45 to make the necessary correction in frequency. Condenser 47 is provided to permit manual adjustment of the frequency of transmitter 1. The operator can thus manually set the beat note of the two transmitters within the operating range of the automatic frequency control 3.

In addition to being used for automatic frequency control the 600 cycle beat note from the monitor receiver 4 is also used to derive a reference signal for transmission by amplitude modulation of transmitter 2. In the filter system 5 the 600 cycle beat note is amplified by tube 48 and coupled to the phase splitting condenser and resistor 49 and 50. The values of these two components are so chosen that the cathode voltages of the two cathode followers 51 and 52 are ninety degrees out of phase. The outputs of these two cathode followers are connected to the two stator windings of a goniometer type phase shifter. By rotating the rotor 54 of the phase shifter 53 any desired value of phase may be selected for the 600 cycle voltage applied to the grid of tube 55 of frequency divider 7.

Tubes 55 and 56 together with their associated circuits comprise a regenerative type frequency divider. Tube 55 is a mixer tube and tube 56 is a harmonic generator. The plate circuit of the mixer tube 55 is tuned to 200 cycles. The 200 cycle voltage across this tuned circuit is applied to the grid of harmonic generator 56. The plate circuit of harmonic generator 56 is tuned to 400 cycles. The 400 cycle voltage from tube 56 is applied to a second grid of mixer tube 55. The 400 and 600 cycles voltages applied to the two grids of tube 55 results in a 200 cycle voltage being maintained in the plate circuit of tube 55. This 200 cycle voltage is amplified by tubes 57, 58, and 59 in the modulator. The modulator applies the 200 cycle voltage as amplitude modulation to the carrier output transformer 60 of transmitter number 2.

Thus, two carrier frequencies are transmitted, one having a fixed phase, the other having a phase characteristic which is dependent on the azimuth position of the aircraft with respect to the transmitters. Since the phases of the two carriers are compared in the aircraft equipment, the indications of the phase meter will be the azimuth measurement desired.

While the invention has been illustrated and described in a particular embodiment it is contemplated that changes in the details, components and circuits may be made within the spirit and scope of the appended claims.

Having thus described the invention, what is claimed is:

1. In a transmitting system a first transmitter operating on a single unmodulated radio frequency and coupled to antennae physically spaced and electrically phased to produce a rotating radio frequency field which varies in phase directly with azimuth, a second transmitter operating on a second radio frequency coupled to a separate antenna which radiates a field that is constant in phase with respect to azimuth the second radio frequency being sufficiently close to the first frequency to permit simultaneous reception of both on a remote receiver, an automatic frequency control to maintain the desired frequency difference between the first and the second transmitter, a monitor receiver located adjacent to the transmitting antennae to receive the two radiated radio frequencies, filtering, phasing, and frequency dividing circuits for converting the output of the monitor receiver to a voltage that is at a subharmonic frequency of the beat note between the two radio transmitters and which bears any desired fixed phase relationship to the beat note between the two transmitters, and a modulator for impressing the subharmonic of the beat note as amplitude modulation on the radio frequency output of the second transmitter.

2. In a transmitting system, a first transmitter operating on a first single unmodulated radio frequency and coupled to antennae physically spaced and electrically phased to produce a rotating radio frequency field that varies in phase directly with azimuth, a second transmitter operating on a second radio frequency and with a separate antenna, producing a radio frequency field at the second frequency that does not vary in phase with azimuth, the frequency difference and the antennae spacing being so chosen that a mobile receiver will have in its output a signal that is the frequency difference between the two radio frequencies and which has a phase variation proportional to azimuth around the transmitting antennae, a fixed monitor receiver receiving the radiated signals from said first transmitter and said second transmitter and deriving a signal having a frequency that is the difference between said first radio frequency and said second radio frequency, means deriving a subharmonic of the difference frequency, and means applying the subharmonic frequency as amplitude modulation to the transmission from said second transmitter.

3. In a transmitting system, a first transmitter operating on a first single unmodulated radio frequency and coupled to antennae physically spaced and electrically phased to produce a rotating radio frequency field that varies in phase directly with azimuth, a second transmitter operating on a second radio frequency and with a separate antennae producing a radio frequency field at the second frequency that does not vary in phase with azimuth, the difference between the two frequencies and the antenna locations being so chosen that a mobile receiver will have in its output a signal that is the frequency difference between the two radio frequencies and which has a phase variation proportional to azimuth around the transmitting antennae, a fixed monitor receiver located in the direction from the transmitting antennae in which maximum beacon stability is desired receiving the radiated signals from said first transmitter and said second transmitter and deriving a signal having a frequency that is the difference between said first radio frequency and said second radio frequency, means deriving a reference signal having a simple ratio other than unity to said difference frequency, and means applying the reference signal as amplitude modulation to the transmission from said second transmitter.

4. In a radio beacon system in combination a pair of broadcast transmitters for propagating in space an amplitude-modulated carrier reference wave and another carrier wave of different frequency and directionally variable phase, said carrier frequencies being in bands which may be simultaneously received by a receiver; a receiver including means for separating the phase characteristics of said carriers and means for directly comparing the phase characteristics of the two carriers by reference to the modulation of said reference wave; and means for determining direction with respect to a reference established by said modulated carrier of constantly corrected phase.

5. The method of transmitting directional radio-frequency beacon signals to indicate azimuthal direction at a distant receiver with respect to the beacon, and comprising radiating continuous wave signals through separate antennae at two different controlled frequencies, the operating band widths being sufficiently close to permit simultaneous reception thereof in a receiver, monitoring said signals in an adjacent monitor receiver by filtering, phasing, and frequency-dividing said signals to derive from said monitor receiver a sub-harmonic reference freqency signal, modulating one frequency signal with said monitor output while transmitting the other unmodulated through physically spaced and electrically phased antennae to produce a rotating radio frequency field, whereby a distant receiver, by multiplying the lower sub-harmonic frequency to equal the higher frequency can directly measure in a phase meter its azimuth-bearing with respect to the beacon, the measurement being the received phase difference between the two frequency signals.

6. An omnidirectional beacon system comprising a first crystal controlled radio transmitter operating at a predetermined frequency, a second crystal-controlled transmitter operating at a slightly lower frequency so as to produce a difference beat frequency when each transmitter is simultaneously broadcasting through separate broadcast antennae, the transmission lines and quadrature antennae of said first transmitter being phase and matched so as to transmit a rotating radio frequency field varying in phase circumferentially as a direct function of azimuth, a monitor receiver network adjacent said antennae for deriving a divided harmonic of the beat frequency, and associated modulator means for impressing said divided beat harmonic frequency as fixed phase reference amplitude modulation on the output of said second transmitter, and synchronous frequency controlling means regulated by said beat frequency monitor output to maintain the difference frequency within accurate limits.

7. In an omnidirectional beacon system, a first transmitter radiating a first carrier having a phase variable with azimuth about said first transmitter, a second transmitter radiating a second carrier having a phase invariant with azimuth about said second transmitter, means at a fixed location deriving from said radiated carriers a reference signal having a frequency in simple ratio other than unity to the difference of the frequencies of said carriers, means in said second transmitter applying said reference signal as amplitude modulation to said second carrier in phase determinable at will, a receiver at a location selected at will receiving said first carrier and said second modulated carrier and measuring the phase of the beat note between said received carriers with reference to said received modulation thereby indicating the azimuth of said selected location, means furnishing a standard frequency signal, means comparing the frequency difference of said carriers with the standard frequency, and means responsive to such comparison and operative on at least one of said transmitters to adjust at least one of said carriers to preserve the frequency difference of said carriers in equality with said standard frequency.

8. In a two-carrier transmitting system, means deriving from the two carriers a first difference signal which is the difference beat between said two carriers, means furnishing a standard frequency signal, means deriving from the standard frequency signal and said first difference signal a second difference signal which is the difference beat between the standard and the first difference signals and having a polarity responsive to whichever of the two foregoing signals is greater, a synchronous motor having a speed responsive to the frequency of said second difference signal and a direction of rotation responsive to the polarity of said second difference signal, and means responsive to said motor adjusting the frequency of at least on carrier to bring the frequency difference of said two carriers into equality with the frequency of said standard signal.

9. In an omnidirectional radio beacon system the method of, transmitting from a beacon a first carrier having phase independent of azimuth and a second carrier having phase varying with azimuth, receiving both carriers at a fixed location, isolating the difference beat between the carriers there received, forming a signal having a frequency in simple ratio to the difference beat and applying it in determined phase as amplitude modulation to the first carrier, receiving both carriers at a selectable location, isolating the difference beat between the carriers there received, converting the difference beat and received modulation on the first carrier to signals of equal frequency, and comparing phases of the converted signals to determine azimuth of the selected location from the beacon.

10. A system comprising a first radio frequency transmitter operating on a first unmodulated carrier frequency, an antenna array coupled to said transmitter, said array including radiator elements electrically phased to produce a rotating field that varies in phase with azimuth; a second radio frequency transmitter operating on a second, slightly lower carrier frequency, an omnidirectional antenna coupled to said second transmitter to produce a beat note frequency when said first and second carrier frequencies are simultaneously received; a monitor receiver network adjacent said antennas for deriving a subharmonic frequency of said beat note frequency, said monitor receiver network including phase shifter means for varying the phase of said subharmonic frequency relative to the phase of said beat note frequency; a modulator for impressing said subharmonic frequency as an amplitude modulation on the radio frequency output of said second transmitter; an automatic frequency control system responsive to the output of said monitor receiver to maintain a constant frequency difference between the carrier frequencies of said first and second transmitters; and a remote, mobile receiver positionable in azimuth relative to said first and second transmitters, said receiver including two channels, one of said channels being responsive to said beat note frequency and the other of said channels being responsive to said subharmonic frequency, said second channel further including frequency multiplier means for raising the frequency of said subharmonic frequency to the frequency of said beat note frequency, and means responsive to the outputs of said two channels for comparing the relative phase of said beat note frequency and said multiplied subharmonic frequency, whereby the position in azimuth of said mobile receiver relative to said transmitter antennas may be determined.

JOHN D. WOODWARD.

REFERENCES CITED

The following references are of record in the file of this patent:

UNITED STATES PATENTS

| Number | Name | Date |
|---|---|---|
| 1,815,246 | Englund | July 21, 1931 |
| 1,933,248 | Evans et al. | Oct. 31, 1933 |
| 1,988,006 | Greig | Jan. 15, 1935 |
| 2,129,004 | Greig | Sept. 6, 1938 |
| 2,252,699 | Byrne | Aug. 19, 1941 |
| 2,253,958 | Luck | Aug. 26, 1941 |
| 2,394,157 | Earp | Feb. 5, 1946 |
| 2,417,807 | Brunner | Mar. 25, 1947 |
| 2,423,305 | Fletcher | July 1, 1947 |
| 2,433,351 | Earp | Dec. 30, 1947 |